(12) United States Patent
Ghannam et al.

(10) Patent No.: US 10,782,412 B2
(45) Date of Patent: Sep. 22, 2020

(54) SENSOR APPARATUS WITH COOLING STRUCTURE

(71) Applicant: Ford Global Technologies, LLC, Dearborn, MI (US)

(72) Inventors: Mahmoud Yousef Ghannam, Canton, MI (US); Segundo Baldovino, Novi, MI (US); Prashant Dubey, Canton, MI (US); Sami A. Alkharabsheh, Dearborn, MI (US); Venkatesh Krishnan, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 215 days.

(21) Appl. No.: 16/038,525

(22) Filed: Jul. 18, 2018

(65) Prior Publication Data

US 2020/0025933 A1 Jan. 23, 2020

(51) Int. Cl.
| | |
|---|---|
| *G05D 23/02* | (2006.01) |
| *G01S 7/481* | (2006.01) |
| *G01S 17/93* | (2020.01) |
| *G01S 17/931* | (2020.01) |
| *F28F 7/02* | (2006.01) |
| *G05D 23/19* | (2006.01) |

(52) U.S. Cl.
CPC .......... *G01S 17/931* (2020.01); *G01S 7/4813* (2013.01); *G01S 7/4817* (2013.01); *G05D 23/02* (2013.01); *F28F 7/02* (2013.01); *G05D 23/19* (2013.01)

(58) Field of Classification Search
CPC ......... F25B 2700/21152; G01S 7/4813; G01S 7/4817; G01S 17/931
See application file for complete search history.

(56) References Cited

U.S. PATENT DOCUMENTS

| | | | |
|---|---|---|---|
| 4,748,941 A | * | 6/1988 | Kashiwase ............... F01P 7/16 123/41.1 |
| 5,263,643 A | * | 11/1993 | Wells ..................... F04B 39/00 236/48 R |
| 9,885,526 B2 | | 2/2018 | Maranville et al. |
| 9,973,664 B2 | | 5/2018 | Lang et al. |
| 2018/0109061 A1 | | 4/2018 | Pardhan et al. |

FOREIGN PATENT DOCUMENTS

| | | |
|---|---|---|
| DE | 102012011590 B4 | 10/2013 |
| DE | 102016201057 A1 | 7/2017 |
| WO | WO-2008018862 A1 * 2/2008 ............ F04B 49/225 |
| WO | 2017119385 A1 | 7/2017 |

* cited by examiner

*Primary Examiner* — Jonathan Bradford
(74) *Attorney, Agent, or Firm* — Frank A. MacKenzie; Bejin Bieneman PLC

(57) ABSTRACT

A sensor apparatus includes an upper chamber, a lower chamber adjacent the upper chamber, a sensor contacting and below the lower chamber, and a valve in communication with the upper and lower chambers and openable in response to a temperature at the valve being above a threshold. The upper chamber may include a dome-shaped upper panel.

12 Claims, 3 Drawing Sheets

SENSOR APPARATUS WITH COOLING STRUCTURE

BACKGROUND

Autonomous vehicles typically include a variety of sensors. One such type of sensor is a light detection and ranging (LIDAR) device. A LIDAR device detects distances to objects by emitting laser pulses and measuring the time of flight for the pulse to travel to the object and back. A LIDAR device can generate 50 watts of heat and is sometimes exposed to prolonged direct sunlight. Excessive heat can degrade performance of a LIDAR device. For example, a LIDAR device can experience performance degradation at above about 65° C.

DETAILED DESCRIPTION

Figure 1:
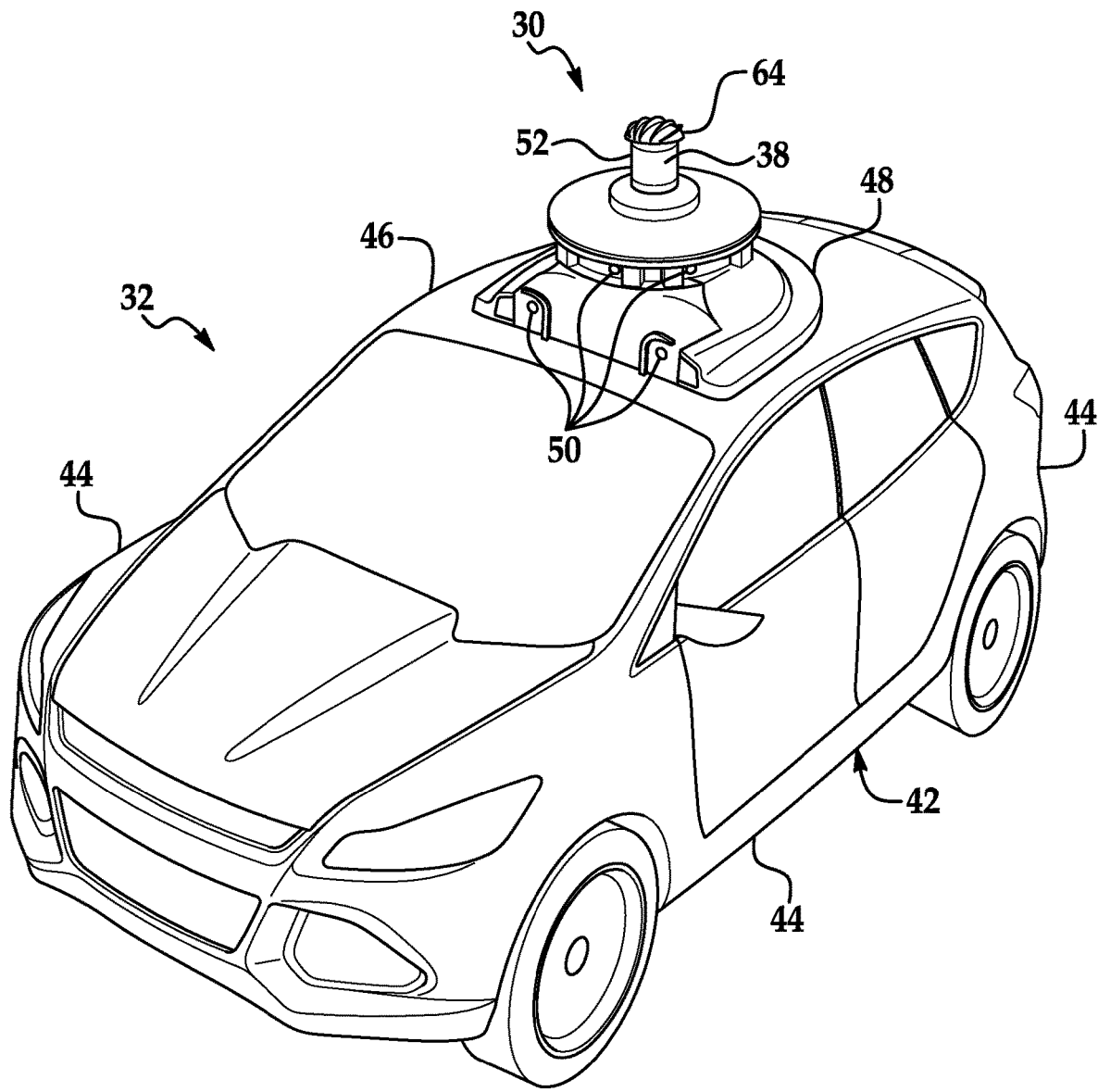
FIG. 1 is a perspective view of an example vehicle.

A sensor apparatus includes an upper chamber, a lower chamber adjacent the upper chamber, a sensor contacting and below the lower chamber, and a valve in communication with the upper and lower chambers and openable in response to a temperature in the lower chamber being above a threshold.

The valve may include a solid-solid phase-change material for which the phase change occurs at the threshold, the valve in a lower-temperature phase may be closed, and the valve in a higher-temperature phase may be open.

The upper chamber may include a dome-shaped upper panel. The upper chamber may include a vent hole at an edge of the upper panel.

The sensor apparatus may further include a plurality of fins extending from the upper panel away from the upper chamber.

The upper panel may include a downward surface facing into the upper chamber that is colored substantially black.

The upper chamber and the lower chamber may both include a shared panel, and the valve may be disposed through the shared panel. The shared panel may be dome-shaped. The upper chamber may include a vent hole at an edge of the shared panel.

The upper chamber may include a dome-shaped upper panel. The shared panel and the upper panel may meet at an edge circumscribing the upper chamber.

The shared panel and the upper panel may each have a concave surface facing the sensor.

The valve may be a first valve, and the sensor apparatus may further include a second valve disposed through the shared panel and openable in response to a temperature in the lower chamber being above the threshold. The first and second valves may be aligned in a direction of travel of a vehicle to which the sensor is attachable.

The shared panel may have an upward surface facing into the upper chamber that is colored substantially white and a downward surface facing into the lower chamber that is colored substantially black.

A sensor apparatus includes an upper chamber, a lower chamber adjacent the upper chamber, a sensor contacting and below the lower chamber, and means for venting air from the lower chamber to the upper chamber based on a temperature in the lower chamber exceeding a threshold.

The upper chamber and the lower chamber may both include a shared panel, and the shared panel may be dome-shaped. The upper chamber may include a dome-shaped upper panel. The shared panel and the upper panel may meet at an edge circumscribing the upper chamber.

The shared panel and the upper panel may each have a concave surface facing the sensor.

As illustrated in the various figures, a sensor apparatus 30 for a vehicle 32 includes an upper chamber 34, a lower chamber 36 adjacent the upper chamber 34, a first sensor 38 contacting and below the lower chamber 36, and a valve 40 in communication with the upper and lower chambers 34, 36 and openable in response to a temperature in the lower chamber 36 being above a threshold.

The sensor apparatus 30 can increase heat transfer from the first sensor 38 to the ambient environment, which can improve performance of the first sensor 38 and reduce possible degradation of the first sensor 38 due to heating. The sensor apparatus 30 can reduce the need for moving parts and electrical power for dissipating the heat from the first sensor 38. The sensor apparatus 30, as described more fully below, can prevent condensation from reaching the first sensor 38. The sensor apparatus 30 can provide these benefits without a significant increase in drag beyond the drag of the first sensor 38.

With reference to FIG. 1, the vehicle 32 may be an autonomous vehicle. A computer can be programmed to operate the vehicle 32 independently of the intervention of a human driver, completely or to a lesser degree. The computer may be programmed to operate the propulsion, brake system, steering, and/or other vehicle systems. For the purposes of this disclosure, autonomous operation means the computer controls the propulsion, brake system, and steering without input from a human driver; semi-autonomous operation means the computer controls one or two of the propulsion, brake system, and steering and a human driver controls the remainder; and nonautonomous operation means a human driver controls the propulsion, brake system, and steering.

The vehicle 32 includes a body 42. The vehicle 32 may be of a unibody construction, in which a frame and the body 42 of the vehicle 32 are a single component. The vehicle 32 may, alternatively, be of a body-on-frame construction, in which the frame supports the body 42 that is a separate component from the frame. The frame and body 42 may be formed of any suitable material, for example, steel, aluminum, etc. The body 42 includes body panels 44, 46 partially defining an exterior of the vehicle 32. The body panels 44, 46 may present a class-A surface, e.g., a finished surface exposed to view by a customer and free of unaesthetic blemishes and defects. The body panels 44, 46 include, e.g., a roof 46, etc.

A casing 48 for second sensors 50 is attachable to the vehicle 32, e.g., to one of the body panels 44, 46 of the vehicle 32, e.g., the roof 46. For example, the casing 48 may be shaped to be attachable to the roof 46, e.g., may have a shape matching a contour of the roof 46 or otherwise facilitating mounting or attachment. The casing 48 may be attached to the roof 46, which can provide the second sensors 50 with an unobstructed field of view of an area around the vehicle 32. The casing 48 may be formed of, e.g., plastic or metal.

Figure 2:
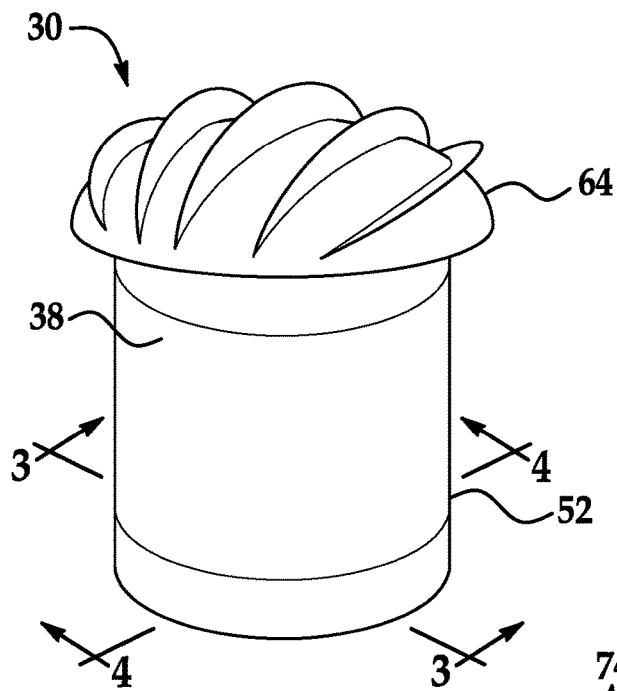
FIG. 2 is a perspective view of a sensor apparatus of the vehicle of FIG. 1.

With reference to FIGS. 1 and 2, the first sensor 38 may detect the location and/or orientation of the vehicle 32. For example, the first sensor 38 may be a global positioning system (GPS) sensors; accelerometer such as piezo-electric or microelectromechanical systems (MEMS); gyroscope such as rate, ring laser, or fiber-optic gyroscopes; inertial measurements unit (IMU); or magnetometer. The first sensor 38 may detect the external world, e.g., objects and/or characteristics of surroundings of the vehicle 32, such as other vehicles, road lane markings, traffic lights and/or signs, pedestrians, etc. For example, the first sensor 38 may be a radar sensor, scanning laser range finder, light detection and ranging (LIDAR) device, or image processing sensor such as a camera. In particular, the first sensor 38 may be a LIDAR device. A LIDAR device detects distances to objects by emitting laser pulses and measuring the time of flight for the pulse to travel to the object and back.

The first sensor 38 may be exposed outside the casing 48. The first sensor 38 may be supported by the casing 48. The first sensor 38 may be mounted indirectly to the roof 46 via the casing 48. The first sensor 38 may have a cylindrical shape oriented vertically, i.e., an axis A of the cylindrical shape is substantially vertical. The first sensor 38 may include a cylindrical sensor window 52 extending about an exterior of the first sensor 38. The sensor window 52 may define the axis A. The first sensor 38 may have a 360° horizontal field of view through the sensor window 52.

Figure 3:
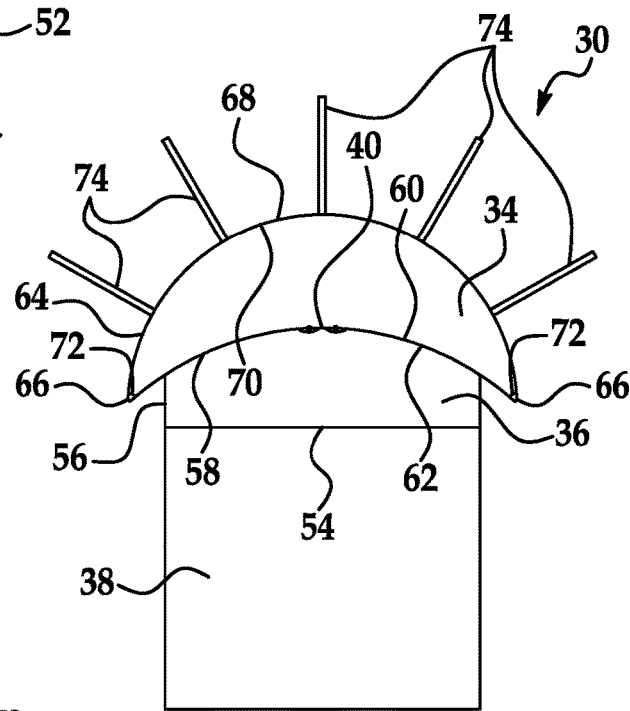
FIG. 3 is a front cross-sectional view of an example sensor apparatus of FIG. 2.
Figure 4:
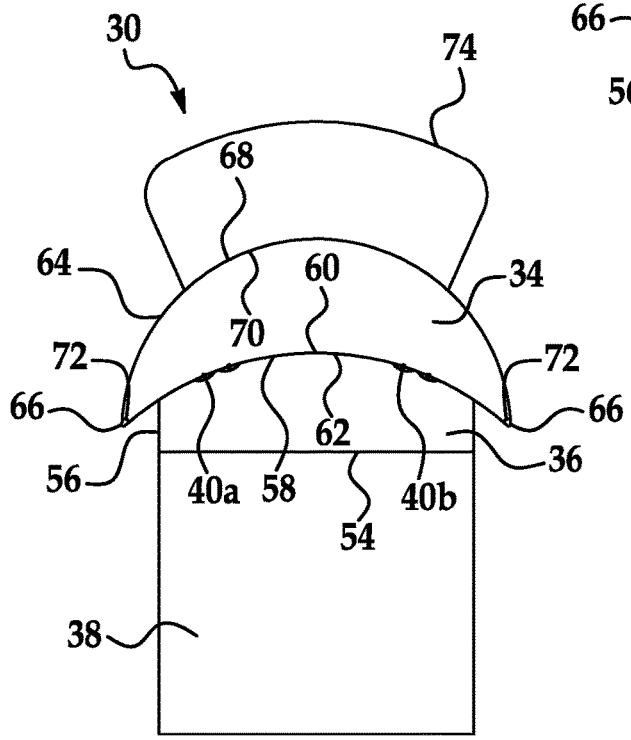
FIG. 4 is a side cross-sectional view of another example sensor apparatus of FIG. 2.

With reference to FIGS. 3 and 4, the lower chamber 36 is above and contacting the first sensor 38. The lower chamber 36 includes a top surface 54 of the first sensor 38, a cylindrical outer wall 56, and a shared panel 58. The lower chamber 36 may have no components of the sensor apparatus 30 inside. Air may be inside the lower chamber 36.

The shared panel 58 is included in both the lower chamber 36 and the upper chamber 34. The shared panel 58 is dome-shaped. For the purposes of this disclosure, "dome-shaped" is defined as generally hemispherical, curving downward in all directions (possibly but not necessarily at a constant rate of curvature) from a highest point. The shared panel 58 has an upward surface 60 facing into the upper chamber 34 and a downward surface 62 facing into the lower chamber 36. The upward surface 60 is convex, is colored substantially white, and faces away from the first sensor 38. The downward surface 62 is concave, is colored substantially black, and faces toward the first sensor 38. The shared panel 58 is typically formed of a material with a high conductivity of heat, e.g., aluminum.

Figure 8:
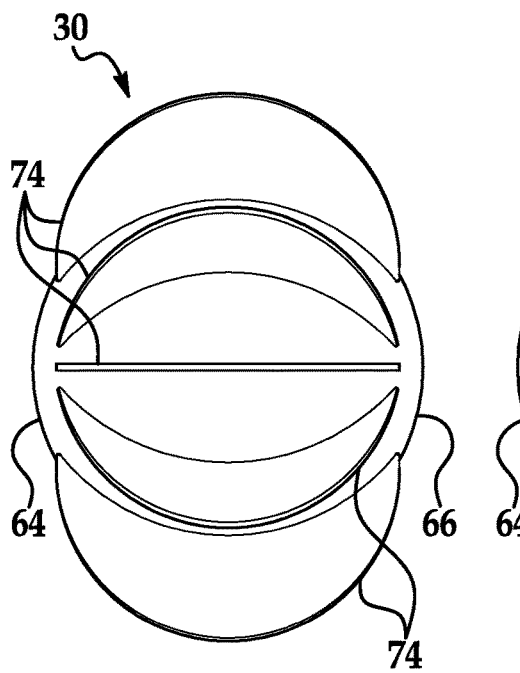
FIG. 8 is a top view of an example upper panel of the sensor apparatus of FIG. 2.
Figure 9:
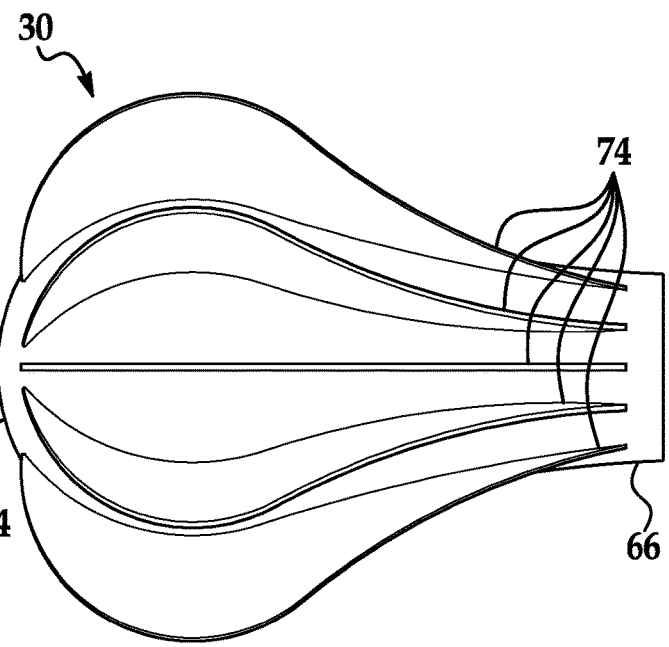
FIG. 9 is a top view of another example upper panel of the sensor apparatus.

The upper chamber 34 is adjacent, i.e., immediately next to or abutting, the lower chamber 36. The upper chamber 34 includes the shared panel 58 and an upper panel 64. The shared panel 58 and the upper panel 64 meet at an edge 66 circumscribing the upper chamber 34. The edge 66 is an edge for the shared panel 58 and an edge for the upper panel 64. The edge 66 extends 360° around the axis A. The edge 66 may be circular, as shown in FIG. 8, or noncircular, as shown in FIG. 9.

The upper panel 64 is dome-shaped. The upper panel 64 may be radially symmetric about the axis A, as shown in FIG. 8, or the upper panel 64 may be elongated in a direction, i.e., rearward relative to the vehicle 32, as shown in FIG. 9. The upper panel 64 has an upward surface 68 facing away from the upper chamber 34 and a downward surface 70 facing into the upper chamber 34. The upward surface 68 is convex, is colored substantially white, and faces away from the first sensor 38. The downward surface 70 is concave, is colored substantially black, and faces toward the first sensor 38. The upper panel 64 may be formed of a material with a high conductivity of heat, e.g., aluminum.

The upper chamber 34 includes a plurality of vent holes 72. The vent holes 72 are located at the edge 66. The vent holes 72 face downward. The vent holes 72 permit condensation that forms in the upper chamber 34 to leave the upper chamber 34 by gravity. Condensation that forms on the upward surface 60 of the shared panel 58 and the downward surface 70 of the upper panel 64 can travel downward along the dome shapes to one of the vent holes 72.

The sensor apparatus 30 includes a plurality of fins 74. The fins 74 extend from the upper panel 64 away from the upper chamber 34, as best seen in FIGS. 3 and 4. The fins 74 extend longitudinally relative to the vehicle 32, i.e., along a vehicle-forward direction, as best seen in FIGS. 8 and 9. Because the fins 74 are oriented longitudinally, the fins 74 present a small projected area in the direction of travel, as best seen in FIG. 3, and thus create a low drag. The fins 74 increase the surface area from which heat can dissipate from the upper chamber 34 to the ambient environment.

With continued reference to FIGS. 3 and 4, the valve 40 is in communication with the upper chamber 34 and the lower chamber 36. The valve 40 is disposed through the shared panel 58. When the valve 40 is open, air can flow between the upper chamber 34 and the lower chamber 36. When the valve 40 is closed, the upper chamber 34 and the lower chamber 36 are fluidly isolated from each other. The shared panel 58 may have only one valve 40, as shown in FIG. 3. Alternatively, the shared panel 58 may have a first valve 40a and a second valve 40b, as shown in FIG. 4. The first valve 40a and the second valve 40b are aligned in a direction of travel of the vehicle 32 to which the first sensor 38 is attachable; in other words, the first valve 40a and the second valve 40b are disposed on a plane oriented longitudinally relative to the vehicle 32. Including both the first valve 40a and the second valve 40b can permit a circular air flow to develop, i.e., from the lower chamber 36 through the first valve 40a to the upper chamber 34 and from the upper chamber 34 through the second valve 40b to the lower chamber 36.

Figure 5:
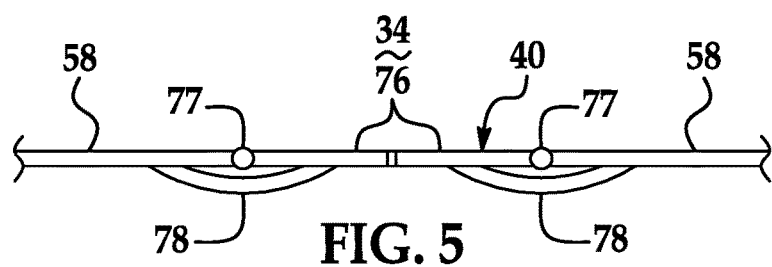
FIG. 5 is a side cross-sectional view of a valve of the sensor apparatus of FIG. 2 in a lower-temperature phase.
Figure 6:
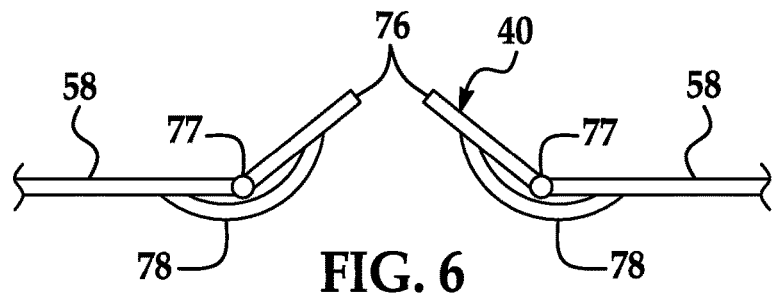
FIG. 6 is a side cross-sectional view of a valve of the sensor apparatus of FIG. 2 in a higher-temperature phase.
Figure 7:
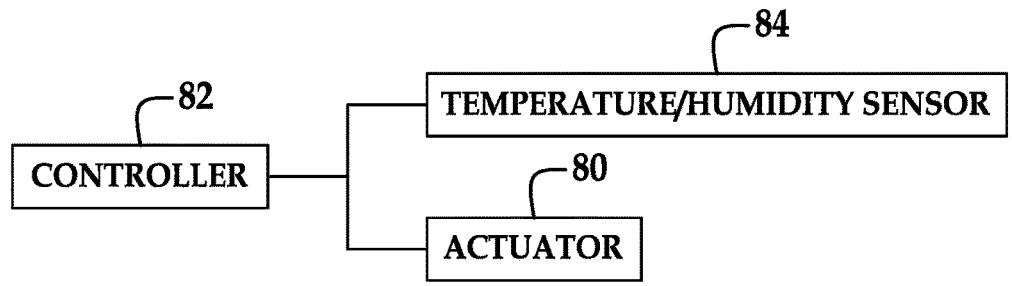
FIG. 7 is a block diagram of an example control system of the sensor apparatus of FIG. 2.

With reference to FIGS. 5-7, air can be vented from the lower chamber 36 to the upper chamber 34 based on a temperature exceeding a threshold. The valve 40, or the first valve 40a and the second valve 40b, is openable in response to a temperature in the lower chamber 36 being above the threshold. When the temperature in the lower chamber 36 is above the threshold, the valve 40 is open, and air can circulate between the lower chamber 36 and the upper chamber 34, which increases the rate of heat transfer from the lower chamber 36 to the upper chamber 34. The threshold may be calibrated based on computer modeling and physical experiments to determine at which point venting appreciably reduces the temperature of the first sensor 38 or failing to vent corresponds to degraded performance of the first sensor 38.

With reference to FIGS. 5 and 6, the valve 40 may include a solid-solid phase-change material for which the phase change occurs at the threshold. A solid-solid phase-change material is a material that, at a fixed temperature, changes its crystalline structure and/or shape between a lower-temperature phase and a higher-temperature phase. The valve 40 is closed when the solid-solid phase-change material is in the lower-temperature phase, and the valve 40 is open when the solid-solid phase-change material is in the higher-temperature phase.

For example, as shown in FIGS. 5 and 6, the valve 40 (or each of the first valve 40a and the second valve 40b) may include two doors 76, two hinges 77 connecting the doors 76 to the shared panel 58, and two lengthening rods 78, each one connected to one of the door 76 and to the shared panel 58. The doors 76 may be rotatable upward into the upper chamber 34. The lengthening rods 78 may be made of the solid-solid phase-change material, and the doors 76 may be made of a different material. In the lower-temperature phase, the lengthening rods 78 have a shorter length, holding the doors 76 closed, as shown in FIG. 5. In the higher-temperature phase, the lengthening rods 78 have a longer length, pushing the doors 76 open, as shown in FIG. 6. Alternatively, the valve 40 may be any suitable shape in which the phase change of a component of the valve 40 made of solid-solid phase-change material shifts the valve 40 between closed and open positions.

Alternatively, with reference to FIG. 7, an actuator 80 may be operably coupled to the valve 40, and a controller 82 may be programmed to actuate the actuator 80 based on data from a temperature/humidity sensor 84. The actuator 80 may be any suitable type for opening and closing the valve 40, e.g., linear or rotational; electric, mechanical, hydraulic, pneumatic, etc.; such as a solenoid, servomechanism, etc.

The temperature/humidity sensor 84 may be any suitable sensor for detecting temperature as well as possibly humidity. The temperature/humidity sensor 84 detects a temperature of a surrounding environment or a contacting object. The temperature/humidity sensor 84 may be disposed in the lower chamber 36 and/or directly attached to the shared panel 58. The temperature/humidity sensor 84 may be any device that generates an output correlated with temperature, e.g., a thermometer, a bimetallic strip, a thermistor, a thermocouple, a resistance thermometer, a silicon bandgap temperature sensor, etc.

The controller 82 is a microprocessor-based controller. The controller 82 includes a processor, memory, etc. The memory of the controller 82 includes memory for storing instructions executable by the processor as well as for electronically storing data and/or databases. The controller 82 is programmed to actuate the actuator 80 to open the valve 40 in response to data from the temperature/humidity sensor 84 indicating a temperature above the threshold. Alternatively or additionally, the controller 82 may be programmed to actuate the actuator 80 to open the valve 40 in response to data from the temperature/humidity sensor 84 indicating a humidity above a humidity threshold or a function of the temperature and humidity above a temperature/humidity threshold. The humidity threshold and/or the temperature/humidity threshold may be chosen based on computer modeling and physical experiments to determine which point corresponds to degraded performance of the first sensor 38.

In operation, the first sensor 38 generates heat. The first sensor 38 may receive transfer from radiant heat from, e.g., sunlight, and the upper panel 64 may partially shield the first sensor 38 from receiving radiant heat. Some heat generated by the first sensor 38 is transferred to the lower chamber 36. When the heat transferring into the lower chamber 36 causes the temperature in the lower chamber 36 (as experienced by the solid-solid phase-change material of the valve 40 or as measured by the temperature/humidity sensor 84) to exceed the threshold, the valve 40 opens, or the first valve 40a and the second valve 40b open. Air circulates between the lower chamber 36 and the upper chamber 34, and the rate of heat transfer from the lower chamber 36 to the upper chamber 34 increases. Heat is transferred from the upper chamber 34 to the ambient environment through the upper panel 64 with the help of the fins 74. The first sensor 38 is thus cooled.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance or order. As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc. Many modifications and variations of the present disclosure are possible in light of the above teachings, and the disclosure may be practiced otherwise than as specifically described.

What is claimed is:

1. A sensor apparatus comprising:
   a sensor having a cylindrical shape defining an axis that is oriented vertically;
   an upper chamber positioned above the sensor relative to the axis;
   a lower chamber adjacent the upper chamber and contacting and above the sensor relative to the axis, wherein the upper chamber and the lower chamber both include a shared panel;
   a first valve disposed through the shared panel and in communication with the upper and lower chambers and openable in response to a temperature in the lower chamber being above a threshold; and
   a second valve disposed through the shared panel and in communication with the upper and lower chambers and openable in response to a temperature in the lower chamber being above the threshold.

2. The sensor apparatus of claim 1, wherein the first valve includes a solid-solid phase-change material for which the phase change occurs at the threshold, the first valve in a lower-temperature phase is closed, and the first valve in a higher-temperature phase is open.

3. The sensor apparatus of claim 1, wherein the upper chamber includes a dome-shaped upper panel above the shared panel relative to the axis.

4. The sensor apparatus of claim 3, wherein the upper chamber includes a vent hole at an edge of the upper panel.

5. The sensor apparatus of claim 3, further comprising a plurality of fins extending from the upper panel away from the upper chamber.

6. The sensor apparatus of claim 3, wherein the upper panel includes a downward surface facing into the upper chamber that is colored substantially black.

7. The sensor apparatus of claim 1, wherein the shared panel is dome-shaped.

8. The sensor apparatus of claim 7, wherein the upper chamber includes a vent hole at an edge of the shared panel.

9. The sensor apparatus of claim 3, wherein the shared panel and the upper panel meet at an edge circumscribing the upper chamber.

10. The sensor apparatus of claim 3, wherein the shared panel and the upper panel each have a concave surface facing the sensor.

11. The sensor apparatus of claim 1, wherein the first and second valves are aligned in a direction of travel of a vehicle to which the sensor is attachable.

12. The sensor apparatus of claim 1, wherein the shared panel has an upward surface facing into the upper chamber that is colored substantially white and a downward surface facing into the lower chamber that is colored substantially black.

\* \* \* \* \*